US012697700B2

(12) United States Patent
Graham et al.

(10) Patent No.: US 12,697,700 B2
(45) Date of Patent: Aug. 4, 2026

(54) ABRASIVE ASSEMBLY WITH ABRASIVE SEGMENTS

(71) Applicant: 3M INNOVATIVE PROPERTIES COMPANY, St. Paul, MN (US)

(72) Inventors: Paul D. Graham, Woodbury, MN (US); Charles R. Wald, Oakdale, MN (US); David M. Mahli, Woodbury, MN (US); Michael J. Annen, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 84 days.

(21) Appl. No.: 18/866,976

(22) PCT Filed: May 19, 2023

(86) PCT No.: PCT/US2023/022987
§ 371 (c)(1),
(2) Date: Nov. 18, 2024

(87) PCT Pub. No.: WO2023/225356
PCT Pub. Date: Nov. 23, 2023

(65) Prior Publication Data
US 2025/0196295 A1 Jun. 19, 2025

Related U.S. Application Data

(60) Provisional application No. 63/344,250, filed on May 20, 2022.

(51) Int. Cl.
B32B 7/06 (2019.01)
B24D 18/00 (2006.01)
B32B 7/12 (2006.01)

(52) U.S. Cl.
CPC ............ B24D 18/0045 (2013.01); B32B 7/06 (2013.01); B32B 7/12 (2013.01); B32B 2405/00 (2013.01)

(58) Field of Classification Search
CPC .. B32B 7/06; B32B 7/12; B24D 3/007; B24D 11/008; B24D 11/001; B24D 18/0072; B24D 18/0045
See application file for complete search history.

(56) References Cited

U.S. PATENT DOCUMENTS 2,958,593 A 11/1960 Hoover et al.
2,963,926 A 12/1960 Fantozzi et al.
(Continued)

FOREIGN PATENT DOCUMENTS

JP 57205071 A * 12/1982
JP S57-205071 A 12/1982
(Continued)

OTHER PUBLICATIONS

Machine Translation of JP57-205071 (Year: 1982).*
International Search Report for PCT Application No. PCT/US2023/022987, mailed on Sep. 5, 2023, 4 pages.

*Primary Examiner* — Daniel Mcnally
(74) *Attorney, Agent, or Firm* — Martha J. Engel; Jonathan V. Sry

(57) ABSTRACT

Aspects of the present disclosure relate to an abrasive assembly and a method of making an abrasive assembly. The method can include receiving a segmented adhesive-backed abrasive article that includes a release liner and a plurality of abrasive segments disposed on the release liner. Each abrasive segment comprises a segment abrasive layer and a segment adhesive layer that each have a smaller planar surface area than a planar surface area of an adhesive-backed abrasive sheet. The release liner of the segmented adhesive-backed abrasive article is continuous and connects the plurality of abrasive segments which are discrete from each other. The method can include applying transfer film assembly to the segmented adhesive-backed abrasive article. A second adhesive layer of the transfer film assembly adheres
(Continued)

to the segment abrasive layer and the segment abrasive layer is sandwiched between the segment adhesive layer of a first adhesive layer and the second adhesive layer.

20 Claims, 16 Drawing Sheets

(56) References Cited

U.S. PATENT DOCUMENTS

| | | | |
|---|---|---|---|
| 4,314,827 A | 2/1982 | Leitheiser et al. |
| 4,331,453 A | 5/1982 | Dau et al. |
| 4,518,397 A | 5/1985 | Leitheiser et al. |
| 4,588,419 A | 5/1986 | Caul et al. |
| 4,623,364 A | 11/1986 | Cottringer et al. |
| 4,652,275 A | 3/1987 | Bloecher et al. |
| 4,734,106 A | 3/1988 | Gollan |
| 4,737,163 A | 4/1988 | Larkey |
| 4,744,802 A | 5/1988 | Schwabel |
| 4,751,138 A | 6/1988 | Tumey et al. |
| 4,770,671 A | 9/1988 | Monroe et al. |
| 4,799,939 A | 1/1989 | Bloecher et al. |
| 4,881,951 A | 11/1989 | Wood et al. |
| 4,927,431 A | 5/1990 | Buchanan et al. |
| 4,991,362 A | 2/1991 | Heyer et al. |
| 5,011,508 A | 4/1991 | Wald et al. |
| 5,078,753 A | 1/1992 | Broberg et al. |
| 5,090,968 A | 2/1992 | Pellow |
| 5,108,463 A | 4/1992 | Buchanan |
| 5,137,542 A | 8/1992 | Buchanan et al. |
| 5,139,978 A | 8/1992 | Wood |
| 5,152,917 A | 10/1992 | Pieper et al. |
| 5,201,916 A | 4/1993 | Berg et al. |
| 5,203,884 A | 4/1993 | Buchanan et al. |
| 5,227,106 A | 7/1993 | Kolvek |
| 5,328,716 A | 7/1994 | Buchanan |
| 5,344,681 A | 9/1994 | Calhoun et al. |
| 5,366,523 A | 11/1994 | Rowenhorst et al. |
| 5,378,251 A | 1/1995 | Culler et al. |
| 5,417,726 A | 5/1995 | Stout et al. |
| 5,429,647 A | 7/1995 | Larmie |
| 5,436,063 A | 7/1995 | Follett et al. |
| 5,490,878 A | 2/1996 | Peterson et al. |
| 5,496,386 A | 3/1996 | Broberg et al. |
| 5,498,269 A | 3/1996 | Larmie |
| 5,520,711 A | 5/1996 | Helmin |
| 5,549,962 A | 8/1996 | Holmes et al. |
| 5,551,963 A | 9/1996 | Larmie |
| 5,556,437 A | 9/1996 | Lee et al. |
| 5,560,753 A | 10/1996 | Schnabel et al. |
| 5,591,239 A | 1/1997 | Larson et al. |
| 5,609,706 A | 3/1997 | Benedict et al. |
| 5,681,361 A | 10/1997 | Sanders, Jr. |
| 5,700,902 A | 12/1997 | Hancock et al. |
| 5,820,450 A | 10/1998 | Calhoun |
| 5,858,140 A | 1/1999 | Berger et al. |
| 5,942,015 A | 8/1999 | Culler et al. |
| 5,954,844 A | 9/1999 | Law et al. |
| 5,961,674 A | 10/1999 | Gagliardi et al. |
| 5,975,988 A | 11/1999 | Christianson |
| 6,017,831 A | 1/2000 | Beardsley et al. |
| 6,059,850 A | 5/2000 | Lise et al. |
| 6,196,911 B1 | 3/2001 | Preston et al. |
| 6,207,336 B1 | 3/2001 | Itaya et al. |
| 6,261,682 B1 | 7/2001 | Law |
| 6,537,140 B1 | 3/2003 | Miller et al. |
| 6,755,878 B2 | 6/2004 | Paxton et al. |
| 8,506,364 B2 | 8/2013 | Beyer et al. |
| 2003/0207659 A1 | 11/2003 | Annen et al. |
| 2005/0032469 A1 | 2/2005 | Duescher |
| 2014/0120724 A1 | 5/2014 | Sung |
| 2014/0187130 A1 | 7/2014 | Gosamo |
| 2017/0043450 A1 | 2/2017 | Graham et al. |
| 2017/0066099 A1 | 3/2017 | Nakamura |

FOREIGN PATENT DOCUMENTS

| | | |
|---|---|---|
| JP | 6452295 B2 | 1/2019 |
| WO | 2001024971 A1 | 4/2001 |
| WO | 2004012906 A1 | 2/2004 |
| WO | 2007021636 A1 | 2/2007 |
| WO | 2021116882 A1 | 6/2021 |

* cited by examiner

OBTAIN ADHESIVE-BACKED ABRASIVE SHEET 202

FORM ABRASIVE SEGMENTS WITHIN THE ABRASIVE SHEET 204

314

406

404

402

| ABRASIVE LAYER 306 |
| ABRASIVE BACKING LAYER 308 |
| FIRST ADHESIVE LAYER 310 |
| RELEASE LINER 312 |

710

708

342

322a 306
318

310

338

340

304

302

710

1002

| CONFORMABLE LAYER 702 |
| BACKING 704 |
| SECOND ADHESIVE LAYER 706 |

338

340

304

302

| RELEASE LINER 312 |

ABRASIVE ASSEMBLY WITH ABRASIVE SEGMENTS

CROSS REFERENCE TO RELATED APPLICATIONS

This application is a national stage filing under 35 U.S.C. 371 of PCT/US2023/022987, filed May 19, 2023, which claims the benefit of U.S. Application No. 63/344,250, filed May 20, 2022, the disclosure of which is incorporated by reference in its/their entirety herein.

BACKGROUND

Many abrasive articles, for example, coated abrasive or nonwoven abrasive articles in the form of sheets or discs, are commonly mounted onto a support pad during use. Typically, the purpose of the support pad is to provide the abrasive article with the foundation for a particular abrading application. For example, if the abrasive article is to be employed at high pressure (e.g., for high stock removal applications), the support pad will typically be durable, heat resistant, and rigid. If the abrasive article is to be employed for finishing contoured surfaces, the support pad will typically be soft and conformable.

For abrasive articles having a backing, one option for mounting the abrasive article onto the support pad involves a pressure-sensitive adhesive (i.e., PSA). For this option, the surface of the backing opposite the abrasive layer typically bears a layer of PSA. The PSA layer typically has sufficient adhesion to hold the coated abrasive article on the support pad for the intended abrading application.

BRIEF SUMMARY

Aspects of the present disclosure relate to a method of making an abrasive assembly. The method can include receiving a segmented adhesive-backed abrasive article that includes a release liner and a plurality of abrasive segments disposed on the release liner. Each abrasive segment comprises a segment abrasive layer and a segment adhesive layer that each have a smaller planar surface area than a planar surface area of an adhesive-backed abrasive sheet. The release liner of the segmented adhesive-backed abrasive article is continuous and connects the plurality of abrasive segments which are discrete from each other.

The method can include applying transfer film assembly to the segmented adhesive-backed abrasive article. A second adhesive layer of the transfer film assembly adheres to the segment abrasive layer and the segment abrasive layer is sandwiched between the segment adhesive layer of a first adhesive layer and the second adhesive layer. In at least one embodiment, a first adhesion between the second adhesive layer and the segment abrasive layer is at least 20 percent, or at least 50 percent greater than a second adhesion between the segment adhesive layer and the release liner.

In at least one embodiment, a first adhesion between the second adhesive layer and the segment abrasive layer is at least two times, or at least four times, a second adhesion between the segment adhesive layer and the release liner.

The method can also include forming the segmented adhesive-backed abrasive article by obtaining the adhesive-backed abrasive sheet comprising an abrasive layer, the first adhesive layer, and the release liner disposed on the first adhesive layer and forming a segmented adhesive-backed abrasive article by forming a plurality of abrasive segments within the adhesive-backed abrasive sheet.

In at least one embodiment, the adhesive-backed abrasive sheet comprises the abrasive layer having a first abrasive side and a second abrasive side, an abrasive backing layer having a first backing side and a second backing side, the first adhesive layer having a first adhesive side and a second adhesive side. The abrasive backing layer is disposed on the second abrasive side, and the first adhesive layer is disposed on the second backing side.

In at least one embodiment, the abrasive layer is continuous prior to forming the plurality of abrasive segments.

In at least one embodiment, the release liner has a first release liner side and a second release liner side. The first release liner side is disposed on the second adhesive side of the first adhesive layer.

In at least one embodiment, forming the plurality of abrasive segments comprises cutting the release liner such that the first release liner side is penetrated but the second release liner side is not penetrated.

In at least one embodiment, cutting the adhesive-backed abrasive sheet occurs in one direction.

In at least one embodiment, an angle of the cut is non-orthogonal to a planar surface of the adhesive-backed abrasive sheet.

In at least one embodiment, cutting the adhesive-backed abrasive sheet occurs in at least two directions, a first direction intersects with a second direction.

In at least one embodiment, cutting the adhesive-backed abrasive sheet occurs in both a cross direction and a machine direction to form border segments within the abrasive segment of the plurality of abrasive segments.

In at least one embodiment, the abrasive segment of the plurality of abrasive segments contacts at least 2 other abrasive segments from the plurality of abrasive segments.

In at least one embodiment, a first adhesion between the first adhesive layer and the contoured surface is greater than a second adhesion between the second adhesive layer and the segment abrasive layer.

In at least one embodiment, the segment abrasive layer does not include a supersize layer.

In at least one embodiment, the first adhesion is determined using ASTM D1876 (2015) and the second adhesion is determined according to ASTM D5375(2019).

In at least one embodiment, the second adhesive layer is continuous.

In at least one embodiment, the release liner is intact and not divided into segments.

In at least one embodiment, the release liner is a microreplicated surface.

In at least one embodiment, forming the segmented adhesive-backed abrasive article comprises printing the plurality of abrasive segments on the release liner.

In at least one embodiment, the abrasive segment has an area no greater than 3 centimeters squared.

In at least one embodiment, the abrasive segment has an area between 100 micrometers squared and 3 centimeters squared.

In at least one embodiment, the segment adhesive layer is a pressure sensitive adhesive.

In at least one embodiment, the method of applying the abrasive assembly includes applying the first adhesive layer of the plurality of abrasive segments to a contoured surface; and removing the transfer film assembly from the contoured surface, wherein at least some of the plurality of abrasive segments from the abrasive assembly are retained on the contoured surface.

In at least one embodiment, the method further comprises removing the release liner before applying the first adhesive layer of the abrasive assembly to the contoured surface.

In at least one embodiment, the transfer film assembly comprises a conformable layer and the second adhesive layer.

In at least one embodiment, an outer surface of the conformable layer is coated with a releasable coating.

In at least one embodiment, the method further includes removing the release liner from the plurality of abrasive segments to form a linerless abrasive assembly; rolling the linerless abrasive assembly such that the segment adhesive layer from the plurality of abrasive segments contacts the conformable layer.

In at least one embodiment, the releasable coating is configured such that the first adhesion between the second adhesive layer and the segment abrasive layer is at least 20 percent greater than a third adhesion between the segment adhesive layer and the releasable coating.

Aspects of the present disclosure relate to an abrasive assembly that includes a transfer film assembly comprising a second adhesive layer. The second adhesive layer is continuous across the transfer film assembly. The abrasive assembly further includes a plurality of abrasive segments. An abrasive segment comprises a segment abrasive layer and a first segment adhesive layer. A planar surface area of the transfer film assembly is greater than a planar surface area of the abrasive segment, and a release liner attached to the segment adhesive layers from the plurality of abrasive segments.

In at least one embodiment, the segment abrasive layer is sandwiched between the segment adhesive layer of the first adhesive layer and the second adhesive layer. A first adhesion between the second adhesive layer and the segment abrasive layer is at least 20 percent greater than a second adhesion between the segment adhesive layer and the release liner.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Aspects of the present disclosure relate to an abrasive assembly that has a plurality of abrasive segments for attaching to a contoured surface, and method of attaching and methods of making the abrasive assembly therein.

Figure 1:
FIG. 1 illustrates a flowchart of a method of attaching an abrasive segment to a contoured surface in accordance with one embodiment.
Figure 1:
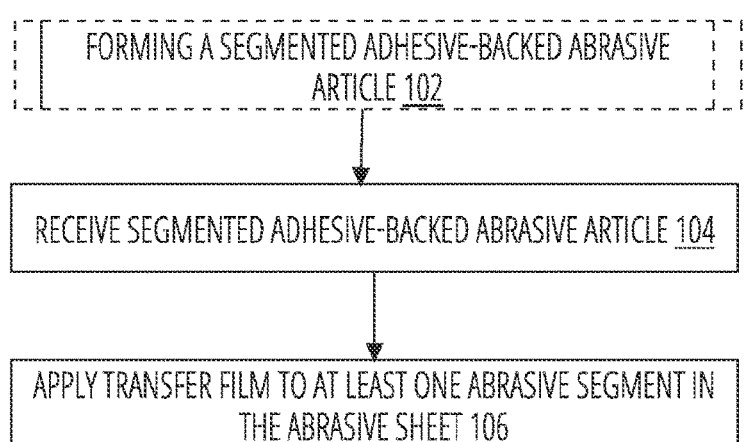

FIG. 1 illustrates a flowchart of a method 100 of making an abrasive assembly according to aspects of the present disclosure. The blocks of method 100 can be described with reference to the figures.

In subroutine block 102, a segmented adhesive-backed abrasive article can be formed. The segmented adhesive-backed abrasive article can be disposed on a release liner. In at least one embodiment, the subroutine block 102 is optional since block 104 and subroutine block 102 do not have to occur at the same facility.

Figure 3A:
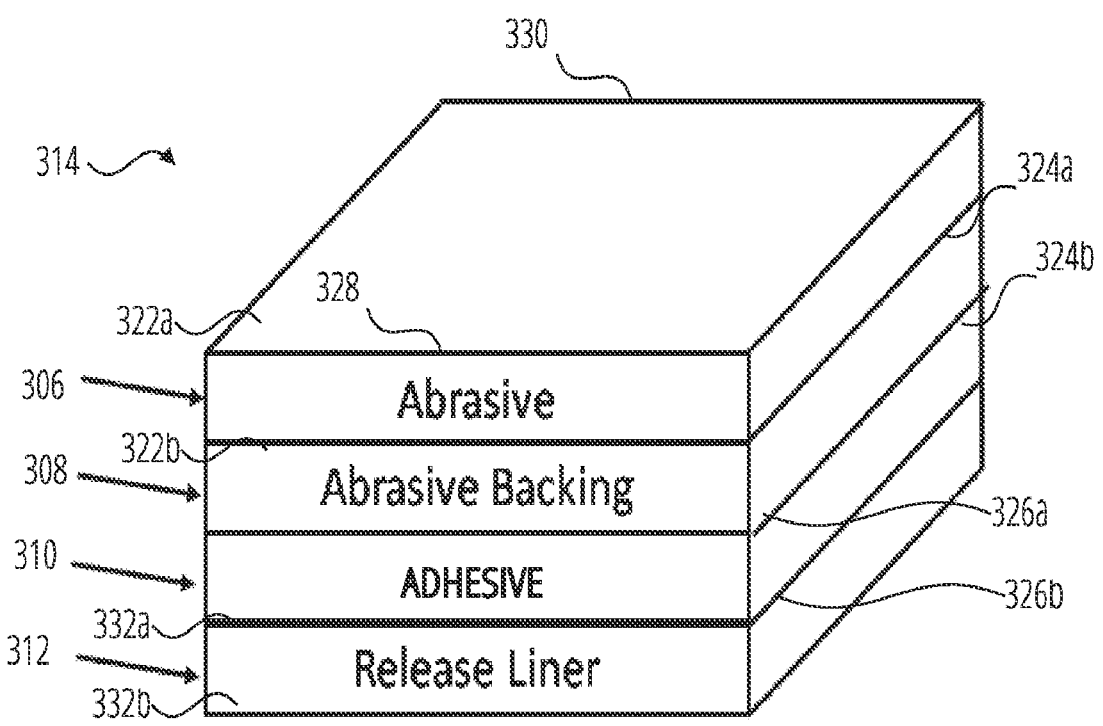
FIG. 3A illustrates an adhesive-backed abrasive sheet in accordance with one embodiment.
Figure 3B:
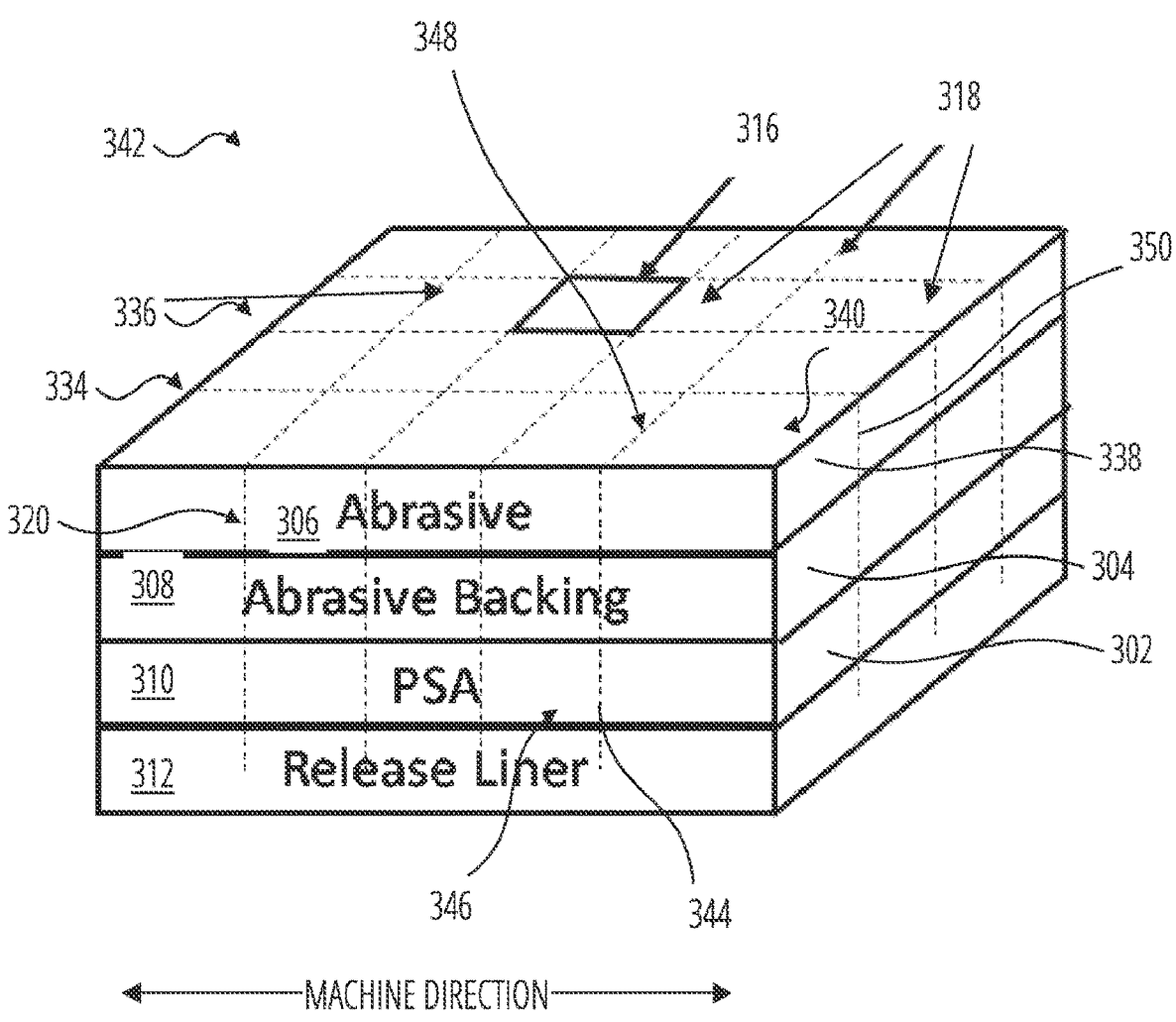
FIG. 3B illustrates the adhesive-backed abrasive sheet of FIG. 3A divided into a plurality of abrasive segments in accordance with one embodiment.
Figure 5:
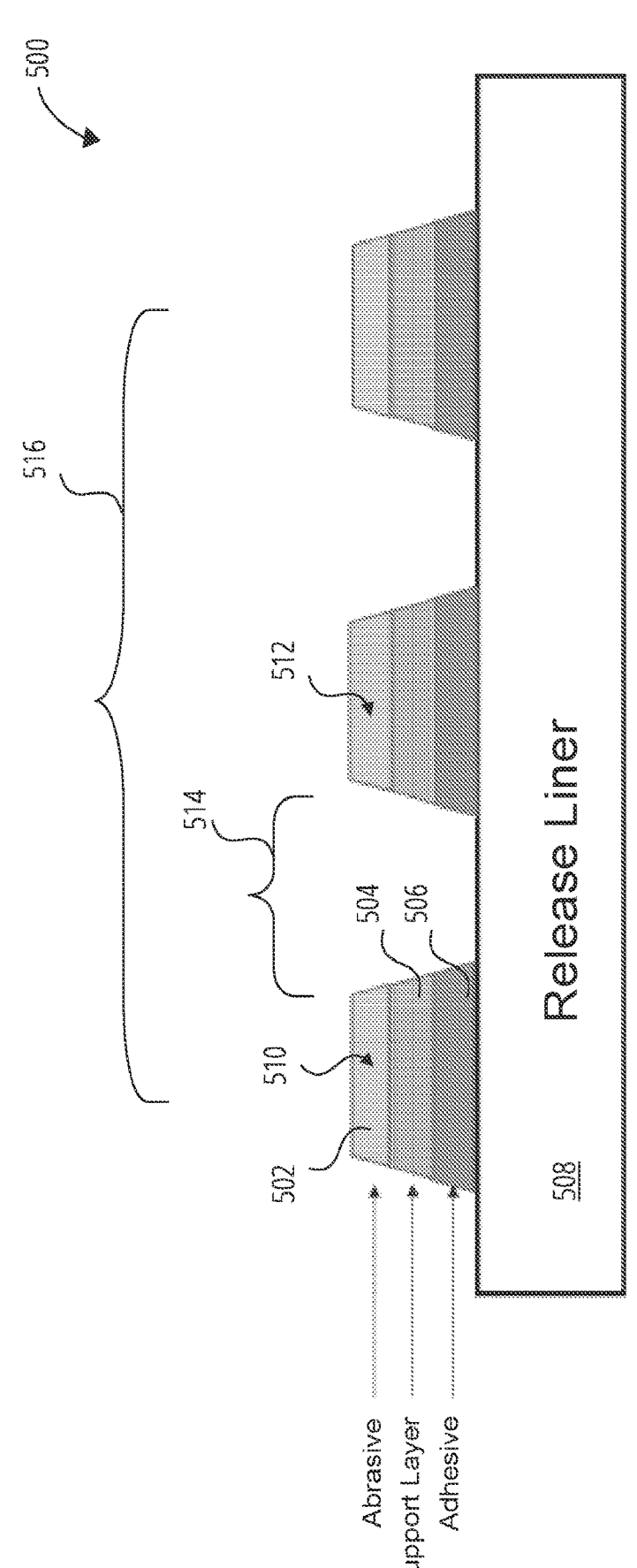
FIG. 5 illustrates an embodiment of a segmented adhesive-backed abrasive article in accordance with one embodiment.
Figure 6A:
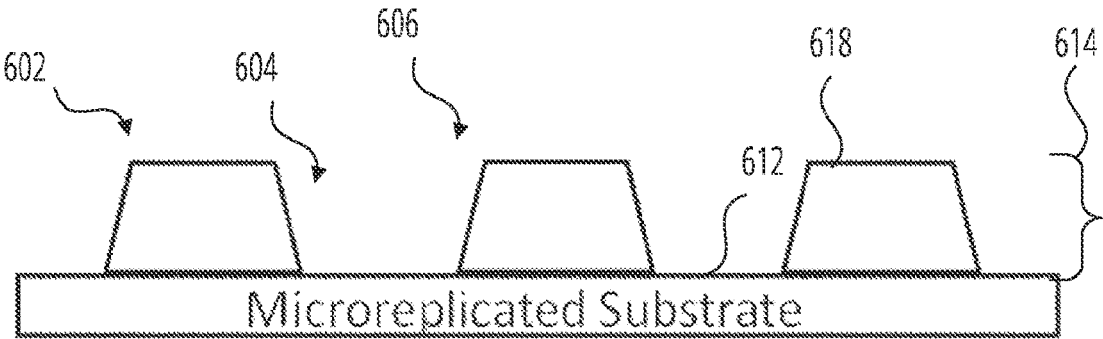
FIG. 6A illustrates a microreplicated release liner in accordance with one embodiment.
Figure 6B:
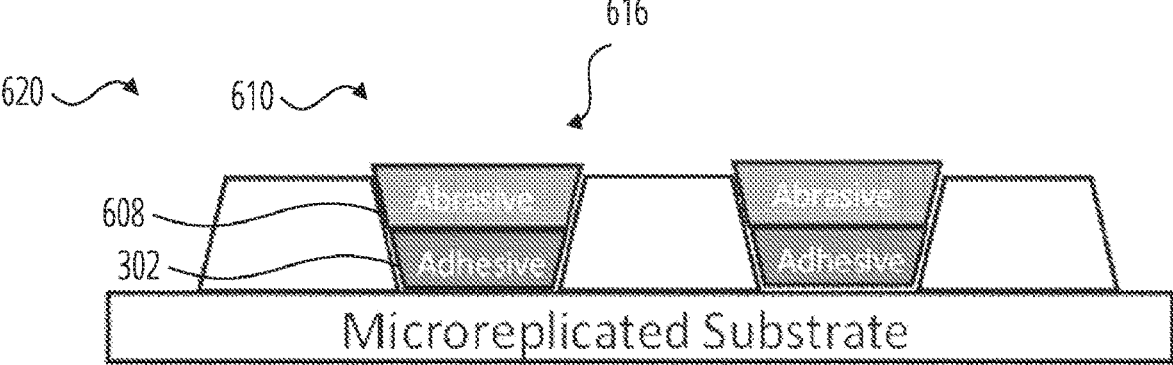
FIG. 6B illustrates an abrasive segment with the microreplicated release liner of FIG. 6A in accordance with one embodiment.

There can be a variety of techniques to form a segmented adhesive-backed abrasive article. Various segmented adhesive-backed abrasive articles can be shown herein. For example, FIG. 3A-FIG. 3B illustrates an adhesive-backed abrasive sheet (a type of segmented adhesive-backed abrasive article), FIG. 5 illustrates discrete pluralities of abrasive segments 516 on a release liner, and FIG. 6A-FIG. 6B illustrate a segmented adhesive-backed abrasive article using a microreplicated release liner.

In block 104, an operator can receive a segmented adhesive-backed abrasive article. The segmented adhesive-backed abrasive article can be an abrasive article that has a plurality of abrasive segments formed therein.

Figure 2:
FIG. 2 illustrates a flowchart of forming a segmented adhesive-backed abrasive article in accordance with one embodiment.
Figure 2:
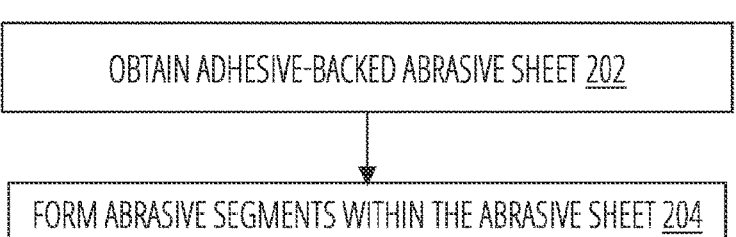

FIG. 2 illustrates a flowchart of a method 200 of forming a segmented adhesive-backed abrasive article. Method 200 can be an embodiment of subroutine block 102. Method 200 can be described with respect to FIG. 3A-FIG. 3B.

In block 202, an operator can obtain an adhesive-backed abrasive sheet comprising an abrasive layer and a first adhesive layer. Examples of adhesive-backed abrasive sheets can be commercially available from 3M (Saint Paul, MN) under the trade designation "Stikit" self-adhesive abrasive. Adhesive-backed abrasive sheets can be made using methods similar to U.S. Pat. No. 6,755,878.

For example, aspects of the present disclosure can relate to coated abrasive articles. Coated abrasive articles generally include an abrasive backing layer 308 and an abrasive layer 306 comprising abrasive particles, and at least one binder to secure the abrasive particles to the abrasive backing layer 308. The abrasive layer 306 can be, for example, a single layer (e.g., a slurry layer) or multiple layers (e.g., make and size layers). Make and size layers and methods for applying them are well known in the abrasive art. They typically comprise one or more binders (e.g., phenolic, urea-formaldehyde, epoxy, epoxy/acrylate), and serve to bond the abrasive particles to the abrasive backing layer 308. The make coat may also serve to seal the abrasive backing layer 308.

Suitable backings to form the abrasive backing layer 308 include those known in the art for making coated or non-woven abrasive articles, including conventional sealed coated abrasive backings and porous non-sealed backings. The abrasive backing layer 308 may be flexible or rigid. Preferably the abrasive backing layer 308 is flexible. The abrasive backing layer 308 may be made of any number of various materials including those conventionally used as backings in the manufacture of coated abrasives.

Exemplary flexible backings include polymeric film (including primed film) such as polyolefin film (e.g., polypropylene including biaxially oriented polypropylene, polyester film, polyamide film, cellulose ester film), fibrous reinforced thermoplastic, metal foil, mesh, foam (e.g., natural sponge material or polyurethane foam), cloth (e.g., cloth made from fibers or yarns comprising polyester, nylon, silk, cotton, and/or rayon), paper, coated paper, vulcanized paper, vulcanized fiber, nonwoven material, combinations thereof, and treated versions thereof. The backing may also be a laminate of two materials (e.g., paper/film, cloth/paper, nonwoven material/paper, film/cloth). Cloth backings may be woven, or stitch bonded. The choice of backing material may depend, for example, on the intended application of the abrasive article.

The thickness of the abrasive backing layer 308 generally ranges from about 0.02 mm to about 5 mm, preferably from about 0.05 mm to about 3.5 mm, and more preferably from about 0.1 mm to about 2 mm, although thicknesses outside of these ranges may also be useful.

An antistatic material may be included in any of these backing treatments. The addition of an antistatic material can reduce the tendency of the abrasive article to accumulate static electricity when sanding wood or wood-like materials.

The abrasive layer 306 may be applied as a slurry of abrasive particles in a binder precursor that is subsequently cured to form the binder. Such slurries of abrasive particles in a binder precursor and techniques for applying them are well known in the abrasive art.

Suitable abrasive particles useful in abrasive layer 306 can include any abrasive particles known in the abrasive art. Exemplary useful abrasive particles include fused aluminum oxide based materials such as aluminum oxide, ceramic aluminum oxide (which may include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and blends thereof. Preferably, the abrasive particles comprise fused aluminum oxide, heat-treated aluminum oxide, ceramic aluminum oxide, silicon carbide, alumina zirconia, garnet, diamond, cubic boron nitride, sol-gel derived abrasive particles, or mixtures thereof.

The abrasive particles may be in the form of, for example, individual particles, abrasive composite particles, agglom-erates (including erodible agglomerates), and mixtures thereof (e.g., having the same or different size(s) and/or composition(s)).

The abrasive particles typically have an average diameter of from about 0.1 micrometers to about 2000 micrometers, more preferably from about 1 micrometer to about 1300 micrometers, although other particles having other diameters can be used.

Coating weights for the abrasive particles may depend on, for example, the type of abrasive article (e.g., coated abrasive article or nonwoven abrasive article), the process for applying the abrasive particles, and the size of the abrasive particles, but typically range from about 5 grams per square meter (g/m$^2$) to about 1350 g/m$^2$.

Abrasive layer 306 can include at least one binder (e.g., in make, size, and/or slurry layers of coated abrasive articles, or coated on a fiber web of nonwoven abrasive articles). Typically, binder(s) is formed by curing (e.g., by thermal means, or by using electromagnetic or particulate radiation) binder precursor(s). Useful binders and binder precursors may be inorganic or organic. Useful binder precursors include thermally curable resins and radiation curable resins, which may be cured, for example, thermally and/or by exposure to radiation. Exemplary organic binder precursors include glue, phenolic resin, aminoplast resin, urea-formaldehyde resin, melamine-formaldehyde resin, urethane resin, (e.g., an aminoplast resin having pendant α,β-unsaturated groups, acrylated urethane, acrylated epoxy, acrylated isocyanurate), acrylic resin, epoxy resin (including bis-male-imide and fluorene-modified epoxy resins), isocyanurate resin, as well as mixtures thereof.

The binder and/or abrasive product may also include additives such as fibers, lubricants, wetting agents, thixotropic materials, surfactants, pigments, dyes, antistatic agents (e.g., carbon black, vanadium oxide, graphite, etc.), grinding aids, coupling agents (e.g., silanes, titanates, zirconaluminates, etc.), plasticizers, wetting agents, suspending agents, and the like. The amounts of these optional additives are selected to provide the properties. The coupling agents can improve adhesion to the abrasive particles and/or filler.

In some embodiments of coated abrasive articles, one or more additional optional coatings that do not diminish the first adhesion (e.g., saturant, presize layer, backsize layer, tie layer) may be present as continuous or discontinuous layers as dictated by the function or purpose of the material as known to one skilled in the art. For example, it may be preferable to provide a saturation coat to smooth the inherent textured surface of the paper backing material, particularly if utilizing fine grades of abrasive.

In at least one embodiment, a supersize layer is not provided as part of the abrasive layer in order to promote adhesion between the abrasive layer and a second adhesive layer. Thus, the abrasive layer does not include metal salts of fatty acids.

Further description of techniques and materials for making coated abrasive articles may be found in, for example, U.S. Pat. No. 4,314,827 (Leitheiser, et al.); U.S. Pat. No. 4,518,397 (Leitheiser, et al.); U.S. Pat. No. 4,588,419 (Caul, et al.); U.S. Pat. No. 4,623,364 (Cottringer, et al.); U.S. Pat. No. 4,652,275 (Bloecher, et al.); U.S. Pat. No. 4,734,106 (Broberg); U.S. Pat. No. 4,737,163 (Larkey); U.S. Pat. No. 4,744,802 (Schwabel); U.S. Pat. No. 4,751,138 (Tumey, et al.); U.S. Pat. No. 4,770,671 (Monroe, et al.); U.S. Pat. No. 4,799,939 (Bloecher, et al.); U.S. Pat. No. 4,881,951 (Wood, et al.); U.S. Pat. No. 4,927,431 (Buchanan, et al.); U.S. Pat. No. 5,498,269 (Larmie); U.S. Pat. No. 5,011,508 (Wald, et al.); U.S. Pat. No. 5,078,753 (Broberg, et al.); U.S. Pat. No.

5,090,968 (Pellow); U.S. Pat. No. 5,108,463 (Buchanan, et al.); U.S. Pat. No. 5,137,542 (Buchanan, et al.); U.S. Pat. No. 5,139,978 (Wood); U.S. Pat. No. 5,152,917 (Pieper, et al.); U.S. Pat. No. 5,201,916 (Berg, et al.); U.S. Pat. No. 5,203,884 (Buchanan, et al.); U.S. Pat. No. 5,227,106 (Bauer); U.S. Pat. No. 5,328,716 (Buchanan); U.S. Pat. No. 5,366,523 (Rowenhorst, et al.); U.S. Pat. No. 5,378,251 (Culler, et al.); U.S. Pat. No. 5,417,726 (Stout, et al.); U.S. Pat. No. 5,429,647 (Larmie); U.S. Pat. No. 5,436,063 (Follett, et al.); U.S. Pat. No. 5,490,878 (Peterson, et al.); U.S. Pat. No. 5,496,386 (Broberg, et al.); U.S. Pat. No. 5,520,711 (Helmin); U.S. Pat. No. 5,549,962 (Holmes, et al.); U.S. Pat. No. 5,551,963 (Larmie); U.S. Pat. No. 5,556,437 (Lee, et al.); U.S. Pat. No. 5,560,753 (Buchanan, et al.); U.S. Pat. No. 5,609,706 (Benedict, et al.); U.S. Pat. No. 5,700,902 (Stoetzel, et al.); U.S. Pat. No. 5,942,015 (Culler, et al.); U.S. Pat. No. 5,954,844 (Law, et al.); U.S. Pat. No. 5,961, 674 (Gagliardi, et al.); U.S. Pat. No. 5,975,988 (Christianson); U.S. Pat. No. 6,059,850 (Lise, et al.); and U.S. Pat. No. 6,261,682 (Law), the disclosures of which are incorporated herein by reference.

In at least one embodiment, the adhesive-backed abrasive sheet 314 can be a nonwoven abrasive article. For example, a nonwoven abrasive article can include an open lofty fiber web having abrasive particles distributed throughout fiber web and adherently bonded therein by an organic binder (not shown). An optional fiber web (not shown) can be affixed to the abrasive backing layer 308. The fiber web may comprise continuous or staple fibers, preferably crimped and/or entangled with one another. Exemplary fibers include polyester fibers, polyamide fibers, and polyaramid fibers. The fiber web may be affixed (i.e., secured) to the abrasive backing layer 308, for example, by needle tacking, stitch bonding, and/or adhesive bonding (e.g., using glue or a hot melt adhesive).

Binders and binder precursors, backings, abrasive particles, optional additives, and optional layers set forth hereinabove for inclusion in coated abrasive articles may also be utilized in nonwoven abrasives according to the present disclosure.

Further description of techniques and materials for making nonwoven abrasive articles may be found in, for example, U.S. Pat. No. 2,958,593 (Hoover, et al.); U.S. Pat. No. 4,331,453 (Dau, et al.); U.S. Pat. No. 4,991,362 (Heyer, et al.); U.S. Pat. No. 5,591,239 (Edblom, et al.); U.S. Pat. No. 5,681,361 (Saunders); U.S. Pat. No. 5,858,140 (Berger, et al.); U.S. Pat. No. 6,017,831 (Beardsley, et al.); and U.S. Pat. No. 6,207,336 (Moren, et al.), the disclosures of which are incorporated herein by reference.

In at least one embodiment, the first adhesive-backed abrasive sheet can be in the form of a jumbo roll having a first longitudinal edge 328 and a second longitudinal edge 330 with terminal edges between second longitudinal edge 330 and first longitudinal edge 328 defining a lateral dimension of the jumbo roll.

For example, adhesive-backed abrasive sheet 314 is shown in FIG. 3A. The adhesive-backed abrasive sheet 314 can include an abrasive layer 306 having a first abrasive side 322a and a second abrasive side 322b. In at least one embodiment, the first abrasive side 322a can be the abrading surface and can abrade the substrate of interest.

The adhesive-backed abrasive sheet 314 can include the abrasive backing layer 308 having a first backing side 324a and a second backing side 324b. In at least one embodiment, the abrasive backing layer 308 can be disposed on the second abrasive side 322b. In at least one embodiment, the abrasive backing layer 308 can be optional.

The adhesive-backed abrasive sheet 314 can also include a first adhesive layer 310 having a first adhesive side 326a and a second adhesive side 326b. In at least one embodiment, the first adhesive layer 310 can be disposed on the second backing side 324b. The first adhesive layer 310 can be a pressure-sensitive adhesive.

Examples of adhesives for the adhesive layer include those known in the art, including hot melt adhesives, tacky adhesives (including pressure-sensitive adhesives), and/or curable adhesives. In at least one embodiment, a heat-activated adhesive can be used in the first adhesive layer 310. One example of a heat activated adhesive is poly (ethylene-co-acrylic acid), available under the trade designation Primacor from SK Global Chemical (Seoul, South Korea).

Pressure-sensitive adhesives are generally described in, for example, "Handbook of Pressure-Sensitive Adhesive Technology", 3rd Ed., D. Satas, Ed., Von Nostrand Reinhold (1989). Exemplary pressure-sensitive adhesives include latex crepe, rosin, acrylic polymers and copolymers including polyacrylate esters (e.g., poly (butyl acrylate)) polyvinyl ethers (e.g., poly(vinyl n-butyl ether)), poly(alpha-olefins), silicones, alkyd adhesives, rubber adhesives (e.g., natural rubber, synthetic rubber, chlorinated rubber), and mixtures thereof.

Adhesive may be applied to the backing, for example, as a pure material, as a solution in a solvent, or as an aqueous dispersion. Methods for applying adhesive to the backing are widely known, and include spraying, curtain coating, roll coating, screen printing, hot melt extrusion coating, knife coating, and the like.

The adhesive layer may be of any weight or thickness. Preferably, the adhesive layer has a coated thickness in a range of from about 1 micrometer to about 314 micrometers, more preferably in a range of from about 5 micrometers to about 170 micrometers. The adhesive layer may be continuous or discontinuous.

In at least one embodiment, the adhesive-backed abrasive sheet 314 can have a release liner 312 disposed on the second adhesive side 326b thereon. For example, the release liner 312 can have a first release liner side 332a and a second release liner sides 332b. The first release liner side 332a can contact the second adhesive side 326b of the first adhesive layer 310. The release liner 312 can be configured to remove from the first adhesive layer 310 and protect the first adhesive layer 310 from sticking to other surfaces while attached to the first adhesive layer 310.

The release liner 312 serves, at least in part, to protect the adhesive layer from accidental adhesion to, or contamination by, various objects such as dust, fingers, or other abrasive articles (e.g., if stacked). Preferably, the release liner 312 is flexible. As used herein, the term "flexible" as applied to the liner means that the liner can be folded flat onto itself and unfolded, at least once, without breaking or cracking. Preferably the release liner 312 is disposable and can be discarded without detriment to the performance of the abrasive article.

With appropriate treatment (e.g., embossing), the release liner 312 can be produced from virtually any material known for use as a release liner 312, but preferably the release liner 312 comprises an extrudable thermoplastic resin. Exemplary extrudable thermoplastic resins include, for example, polyesters such as poly (ethylene terephthalate), polyolefins (e.g., polypropylene, polybutylene, copolymers of polypropylene and ethylene, or polyethylene), polystyrenes (e.g., poly(styrene-co-acrylonitrile) and poly(acrylonitrile-co-butadiene-co-styrene)), plasticized polyvinyl chloride, polycarbonates, and polymethacrylates. Preferably, the extrudable thermoplastic comprises a polyolefin, more preferably the extrudable thermoplastic comprises polypropylene, polyethylene, and/or a copolymer of propylene and ethylene. Although the release liner 312 is shown as sheet-like and planar, other release liners can be three-dimensional.

In block 204, an operator can form a plurality of abrasive segments 318 within the adhesive-backed abrasive sheet 314 to form a segmented adhesive-backed abrasive article 342 as shown in FIG. 3B. In at least one embodiment, the abrasive layer 306 can be continuous before block 204 but discontinuous and/or discrete after block 204.

In at least one embodiment, an instrument can form a plurality of slits 336 including a plurality of longitudinal slits 334 (e.g., formed in the machine direction) and a plurality of lateral slits 320 (e.g., formed in the cross direction) that intersect each other. The plurality of slits 336 can be formed as described in U.S. Pat. No. 8,506,364, WO 01/24971 (3M Innovative Properties Company, Carpentier et al), WO 2004/012906 (3M Innovative Properties Company, Paxton et al), and WO 2007/021636 (3M Innovative Properties Company, Minick et al).

In at least one embodiment, the release liner 312 can be intact and/or continuous. In at least one embodiment, the release liner 312 can be intact and not divided into discrete segments. The release liner 312 can connect the plurality of abrasive segments. In this configuration, the plurality of abrasive segments 318 are discrete from each other and connected through the release liner 312.

In at least one embodiment, a slit from the plurality of slits 336 do not penetrate the first release liner side 332a. In at least one embodiment, the plurality of slits 336 may penetrate the first release liner side 332a but does not penetrate the second release liner side 332b. Further, forming the plurality of abrasive segments 318 can include forming a line of weakness in the release liner 312 as described in U.S. Pat. No. 8,506,364. In at least one embodiment, the line of weakness can allow the release liner 312 to be used for its intended purpose but also permits an abrasive segment to be separated from another abrasive segment.

Further, the plurality of slits 336 formed in the adhesive-backed abrasive sheet 314 can define a plurality of abrasive segments 318. Each abrasive segment can contact and/or abut at least two other abrasive segments. In at least one embodiment, an abrasive segment can share a border segment (e.g., border segment 348) (formed from the plurality of slits 336) with at least two other abrasive segments. For example, abrasive segment 316 is shown sharing border segments with four abrasive segments. Abrasive segment 340 is shown sharing border segments with two abrasive segments because of the corner placement. Abrasive segment 346 is shown with three border segments abutting three abrasive segments. In at least one embodiment, adjacent abrasive segments can be offset from an adjacent row such that one border segment of an abrasive segment can abut two different abrasive segments.

Further, abrasive segment 340 can be formed by at least the lateral slit 344 which separates abrasive segment 340 from an adjacent abrasive segment in the machine direction. The abrasive segment 340 can also be formed by a longitudinal slit 350 along the machine direction.

Each abrasive segment such as abrasive segment 340 can include a segment abrasive layer 338, a segment backing layer 304, and segment adhesive layer 302. In at least one embodiment, the segment adhesive layer 302 can have a smaller planar surface area than the planar surface area from the abrasive layers 306 and first adhesive layer 310.

In at least one embodiment, the abrasive segment 316 can have an area no greater than 3 centimeters squared, no greater than 2 centimeters squared, or no greater than 1 centimeter squared, no greater than 10 millimeters squared, or no greater than 4 millimeters squared.

Figure 4:
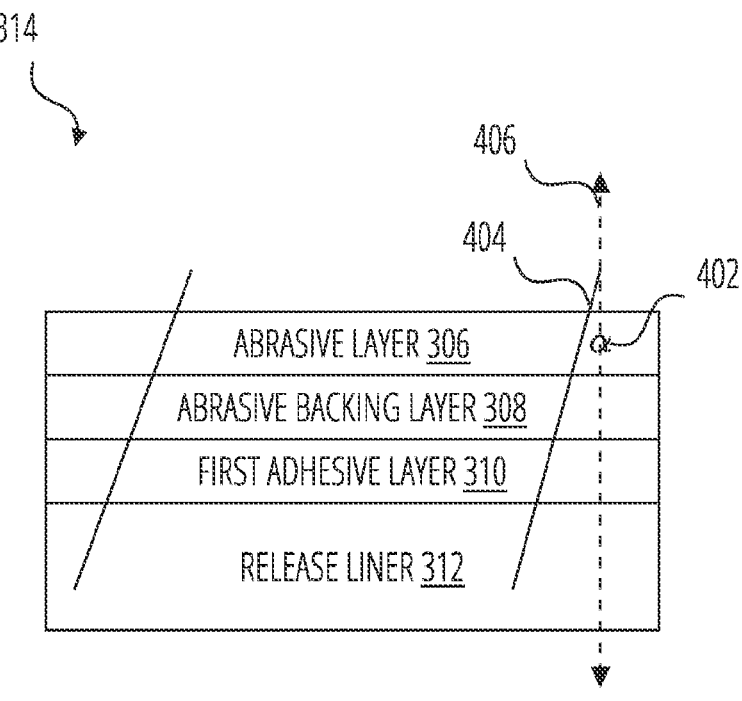
FIG. 4 illustrates an embodiment of an adhesive-backed abrasive sheet in accordance with one embodiment.

FIG. 4 illustrates an embodiment of adhesive-backed abrasive sheet 314 except that lateral slits 404 are formed at a non-orthogonal angle. For example, axis 406 can be normal to a planar surface of the adhesive-backed abrasive sheet 314. The lateral slits 404 can be formed at angle 402, which is non-orthogonal to a planar surface of the abrasive layer 306.

FIG. 5 illustrates a segmented adhesive-backed abrasive article 500 having a plurality of abrasive segments 516 disposed on a release liner 508. The plurality of abrasive segments 516 can be formed on the release liner 508 through a process that allows each discrete, separate abrasive segment (e.g., abrasive segment 510) to have a distance 514 between another abrasive segment (abrasive segment 512) as the plurality of abrasive segments 516 are formed.

Each of the plurality of abrasive segments 516 can be formed by depositing layers on top of a preceding layer. The segmented adhesive-backed abrasive article 500 can be produced by a series of pattern coating steps, including screen printing and other printing techniques. The method could include 1) providing a release liner, 2) applying a segment adhesive layer 506 in a discrete pattern, 3) an optional step of applying a segment backing layer 504 onto the segment adhesive layer 506, and 4) a final step of applying an abrasive slurry to form the segment abrasive layer 502.

For example, PCT Published App. No. WO 2021/116882 to Li et al describes discrete pattern elements involving different layers of material on a fabric substrate. For example, the plurality of abrasive segments 516 can be disposed on the release liner 508 by any suitable means, including by using a (rotary) stencil/screen printing roll, flatbed screen/stencil printing or by directly printing uncured segment adhesive layer 506 onto the release liner 508 or by using combinations of two or more suitable methods (e.g., extrusion die coating, curtain coating, knife coating, gravure coating, and spray coating) for joining the uncured segment adhesive layer 506 to the release liner 508.

Similar methods can be used to deposit the plurality of abrasive segments 516 on the release liner 508 to form segmented adhesive-backed abrasive article 500. Constructions such as segmented adhesive-backed abrasive article 500 can be advantageous because it does not require the time-consuming step of individually forming each of the abrasive segments.

FIG. 6A illustrates a microreplicated release liner 602 that is similar the release liner described in U.S. Pat. No. 6,755,878 and made using similar methods. For example, the microreplicated release liner 602 can include a plurality of protrusions 606 formed therein. Between the plurality of protrusions 606 can be a plurality of voids 604. The plurality of plurality of voids 604 can be defined by a dimension 614 that extends from a plane established by a major surface 618 of the plurality of protrusions 606 to a plane established by the major surface 612. In at least one embodiment, the microreplicated release liner 602 can be a microreplicated transfer film configured to be coated with the segment adhesive layer 302 and segment abrasive layer 608. In at least one embodiment, the microreplicated release liner 602 can be coated with a substance that lowers the peel force adhesion between the segment adhesive layer 302 and the major surface 612.

FIG. 6B illustrates a method where the plurality of abrasive segments 610 are deposited within the plurality of voids 604 to form segmented adhesive-backed abrasive article 620. Each abrasive segment of the plurality of abrasive segments 610 are separate and discrete from another abrasive segment. Each abrasive segment (e.g., abrasive segment 616) can include a segment adhesive layer 302 and segment abrasive layer 608. In at least one embodiment, the segment abrasive layer 608 can extend beyond a plane established by the major surface 618.

In block 106, the operator can apply a transfer film assembly 708 to the plurality of abrasive segments 318 of the segmented adhesive-backed abrasive article 342. The transfer film assembly 708 can be configured to hold the plurality of abrasive segments 318 when the release liner 312 is removed.

Figure 7:
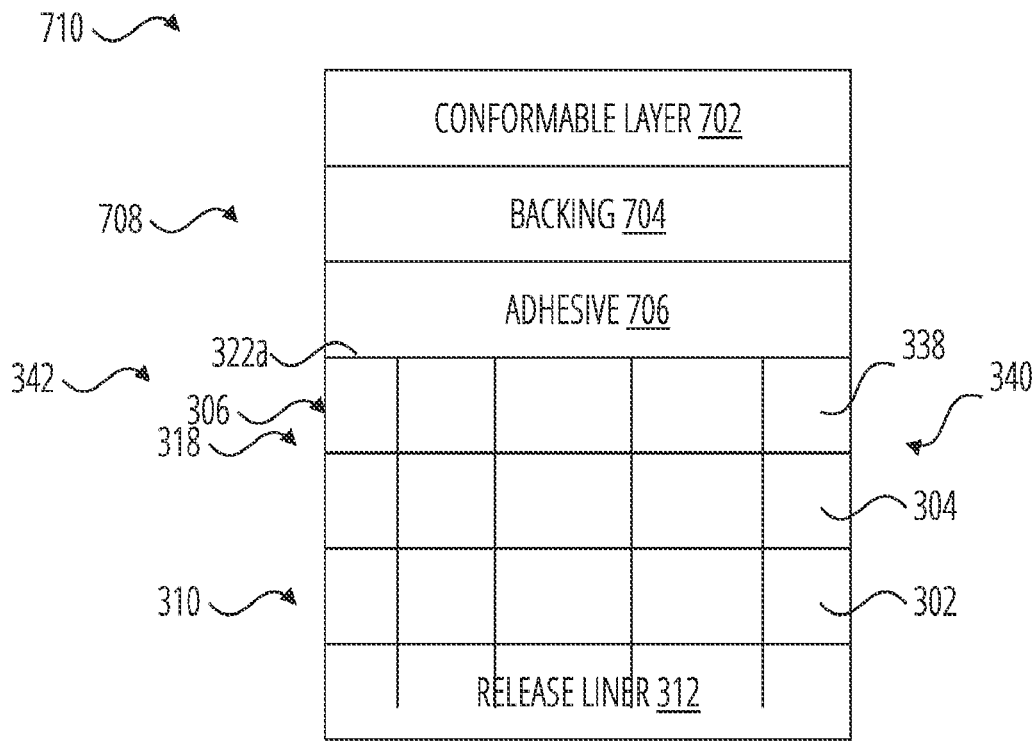
FIG. 7 illustrates a cross-sectional view of an abrasive assembly in accordance with one embodiment.

As shown in FIG. 7, the transfer film assembly 708 can include a conformable layer 702, a backing 704, and a second adhesive layer 706. In at least one embodiment, the second adhesive layer 706 is disposed over a plurality of abrasive segments 318. The second adhesive layer 706 can adhere to the abrasive layer 306 of the segmented adhesive-backed abrasive article 342 to form an abrasive assembly 710. In at least one embodiment, the abrasive layer 306 is sandwiched between the first adhesive layer 310 and the second adhesive layer 706. For example, the segment abrasive layer 338 can be sandwiched between segment adhesive layer 302 of abrasive segment 340 and second adhesive layer 706 of transfer film assembly 708.

In at least one embodiment, the transfer film assembly 708 can have a planar surface area that is greater than a planar surface area of any abrasive segment of the plurality of abrasive segments 318. In at least one embodiment, the transfer film assembly 708 can have a planar surface area that is greater than a planar surface area of the entirety of the plurality of abrasive segments 318.

In the abrasive assembly 710, a first adhesion between the second adhesive layer 706 and the segment abrasive layer 338 can be at least 5 percent, at least 10 percent, at least 20 percent, at least 25 percent, at least 30 percent, at least 35 percent, and at least 40 percent greater (or any integer between the two aforementioned end points such as 21 percent or 24 percent) than a second adhesion between the segment adhesive layer 302 and the release liner 312. The first adhesion and second adhesion can be measured per unit area. For example, the first adhesion can be a t-peel adhesion determined according to ASTM D1876 (2015).

In at least one embodiment, a first adhesion between the second adhesive layer and the segment abrasive layer is at least 2 times, 4 times, 16 times, 32 times, 50 times, at least 70 times, at least 90 times, at least 110 times, or at least 130 times a second adhesion between the segment adhesive layer and the release liner.

In at least one embodiment, the first adhesion could be at least 0.25 pounds per inch, or at least 0.5 pounds per inch. In at least one embodiment, the second adhesion can be no greater than 2.0 pounds per inch, no greater than one pound per inch, no greater than 0.1 pounds per inch and no greater than 0.05 pounds per inch.

Figure 8:
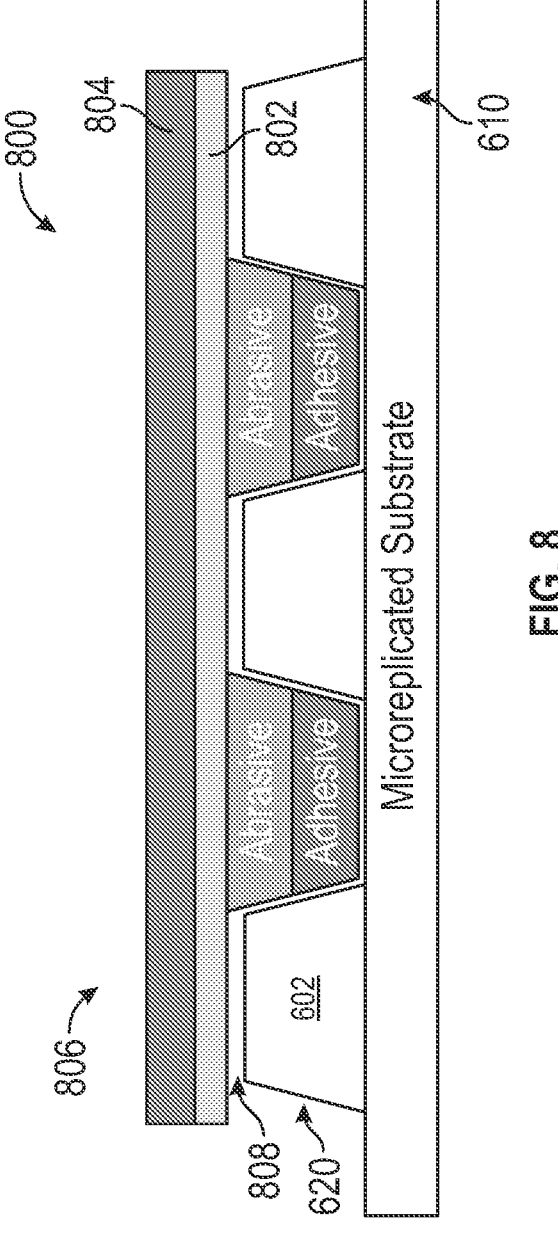
FIG. 8 illustrates an abrasive assembly in accordance with one embodiment.

As shown in FIG. 8, the transfer film assembly 806 can include the backing 804 and second adhesive layer 802. The transfer film assembly 806 is configured similarly to transfer film assembly 708. The second adhesive layer 802 can adhere to the segment abrasive layer of the plurality of abrasive segments 610 as shown in FIG. 7. In at least one embodiment, the abrasive assembly 800 can be configured with a gap 808 between a distal surface of one of the plurality of protrusions 606 and the second adhesive layer 802. The gap 808 can facilitate easier removal of the microreplicated release liner 602.

Figure 9:
FIG. 9 illustrates a flowchart of a method of attaching an abrasive segment to a contoured surface in accordance with one embodiment.
Figure 9:
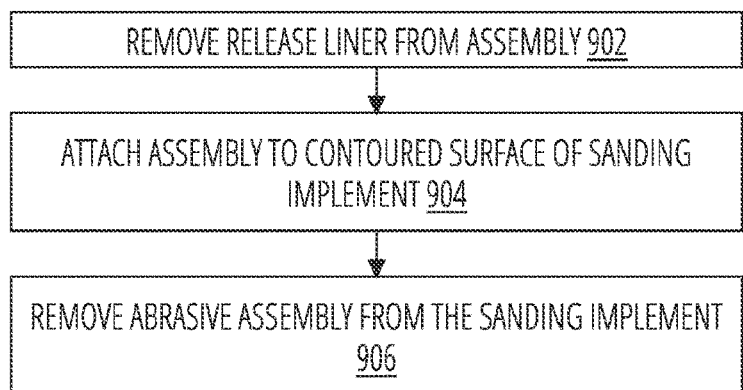

FIG. 9 illustrates a flowchart of a method 900 of using the abrasive assembly 710 on a contoured surface 1102 that may correspond to a sanding implement. As used herein, the contoured surface can refer to a type of surface within a sanding implement. The method 900 can be described with reference to FIG. 10, FIG. 11A, and FIG. 11B.

In block 902, a user can remove the release liner 312 from the abrasive assembly 710 to form a linerless abrasive assembly 1002.

Figure 10:
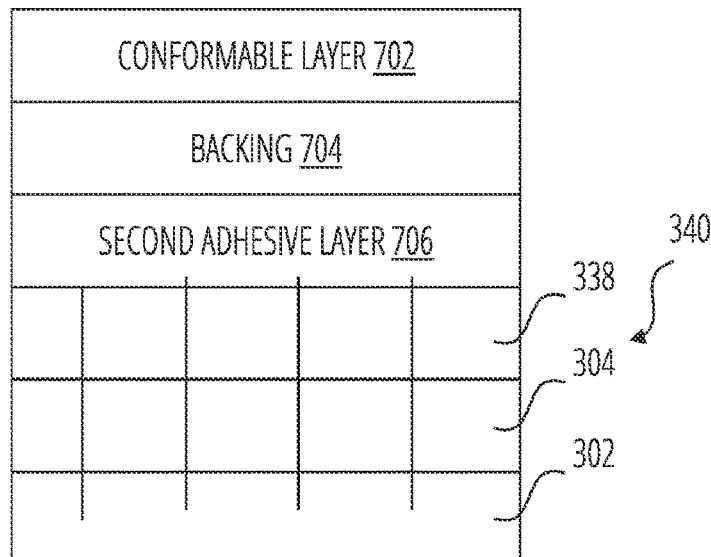
FIG. 10 illustrates forming a linerless abrasive assembly in accordance with one embodiment.

FIG. 10 illustrates the abrasive assembly 710 shown in FIG. 7, except with the release liner 312 separated from the abrasive assembly 710 thereby forming a linerless abrasive assembly 1002. In at least one embodiment, the user can remove the release liner 312 before applying the segment adhesive layer 302 of the abrasive segment 340 to a contoured surface 1102.

Figure 11A:
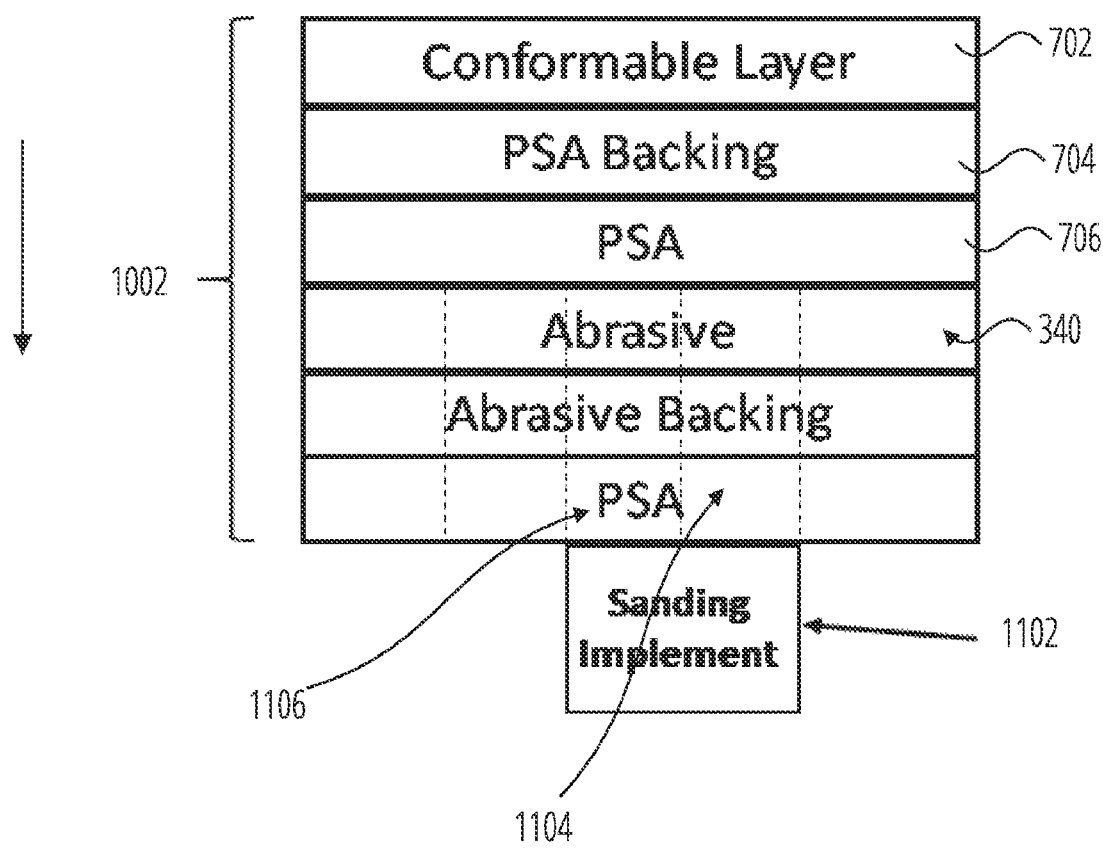
FIG. 11A illustrates attaching the linerless abrasive assembly to a contoured surface in accordance with one embodiment.

In block 904, a user can apply the linerless abrasive assembly 1002 to a contoured surface 1102 using an applied pressure as shown in FIG. 11A. A segment adhesive layer can contact the contoured surface 1102 which is configured to bond the abrasive segment 1104 to the contoured surface 1102. For example, the segment adhesive layer of both the abrasive segment 1104 and abrasive segment 1106 (but not the abrasive segment 340) can contact the contoured surface 1102. In at least one embodiment, the adhesive strength between the segment adhesive layer and the contoured surface can be greater than the adhesive strength between the second adhesive layer and the segment abrasive layer.

Figure 11B:
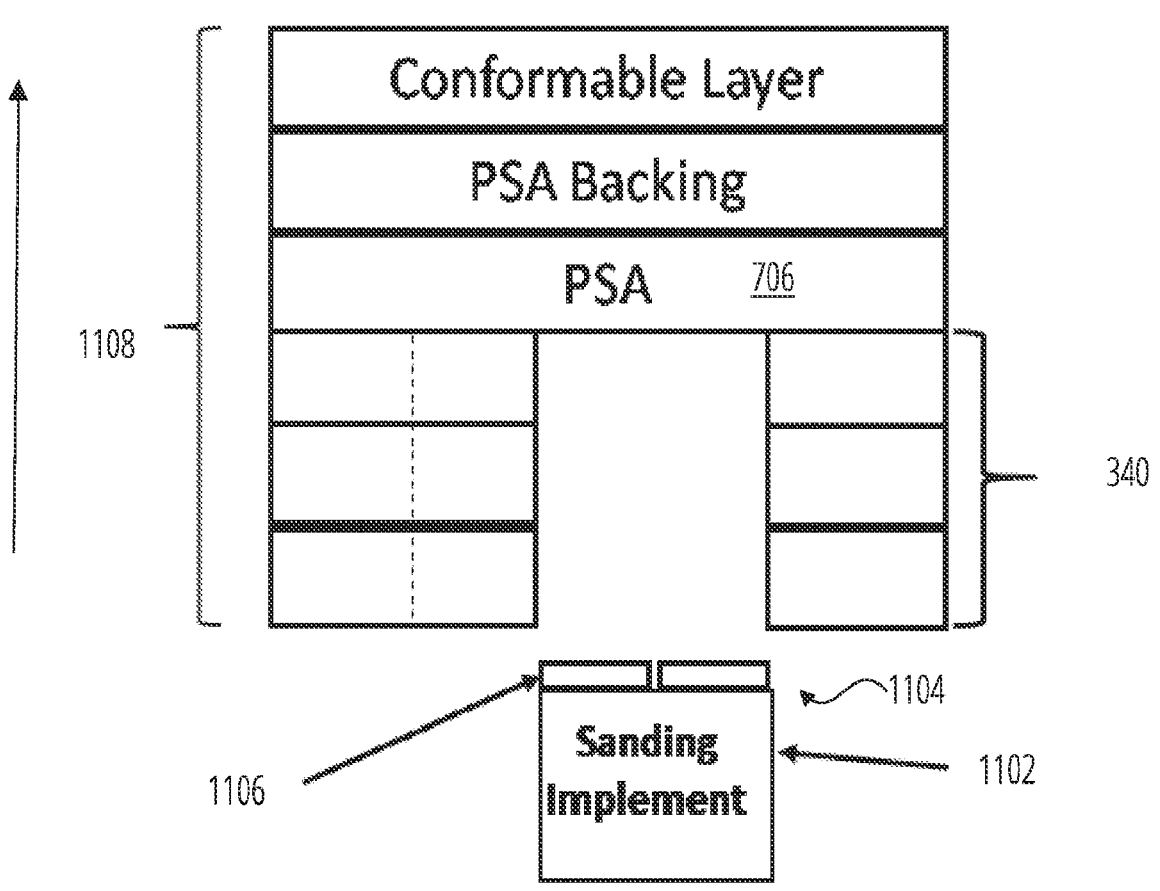
FIG. 11B illustrates removing the remaining abrasive assembly from the contoured surface in accordance with one embodiment.

In block 906, a user can remove the linerless abrasive assembly 1002 as shown in FIG. 11B from the contoured surface 1102.

As the linerless abrasive assembly 1002 is removed, at least some of the plurality of abrasive segments (e.g., abrasive segment 1106, and abrasive segment 1104) are retained on the contoured surface 1102. The remaining abrasive assembly 1108 can be removed and discarded/reused.

Figure 12:
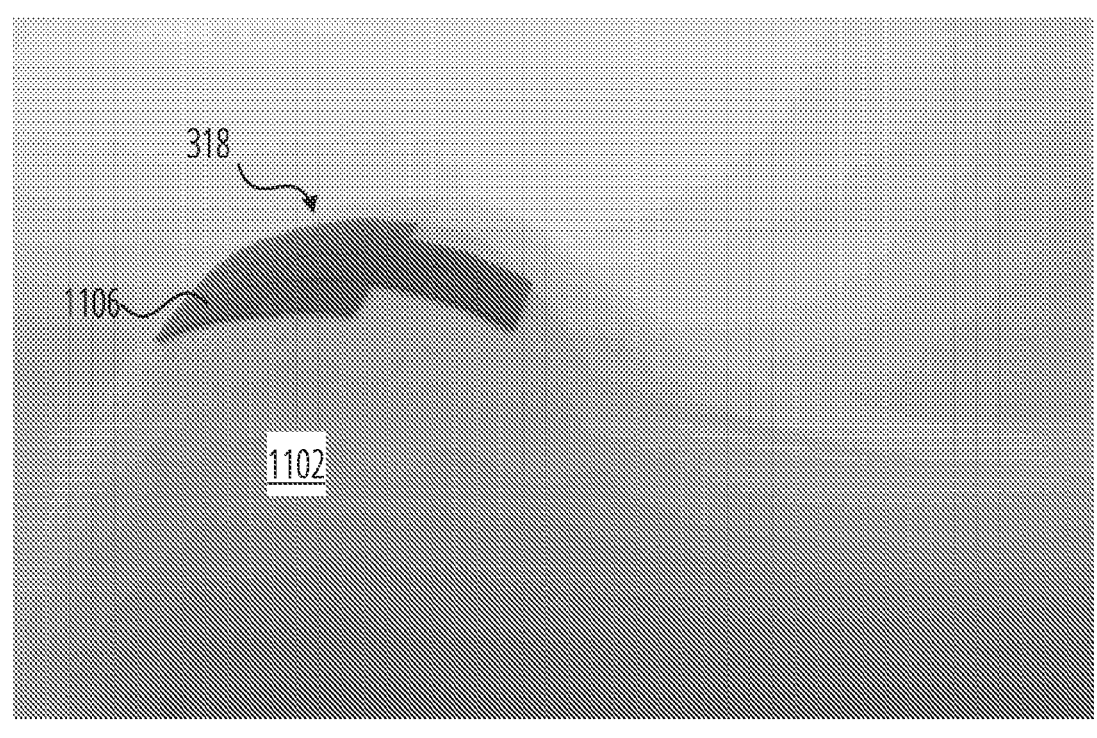
FIG. 12 illustrates an image of a plurality of abrasive segments attached to a contoured surface in accordance with one embodiment.

FIG. 12 illustrates the plurality of abrasive segments 318 (including abrasive segment 1106) on the contoured surface 1102.

Figure 13:
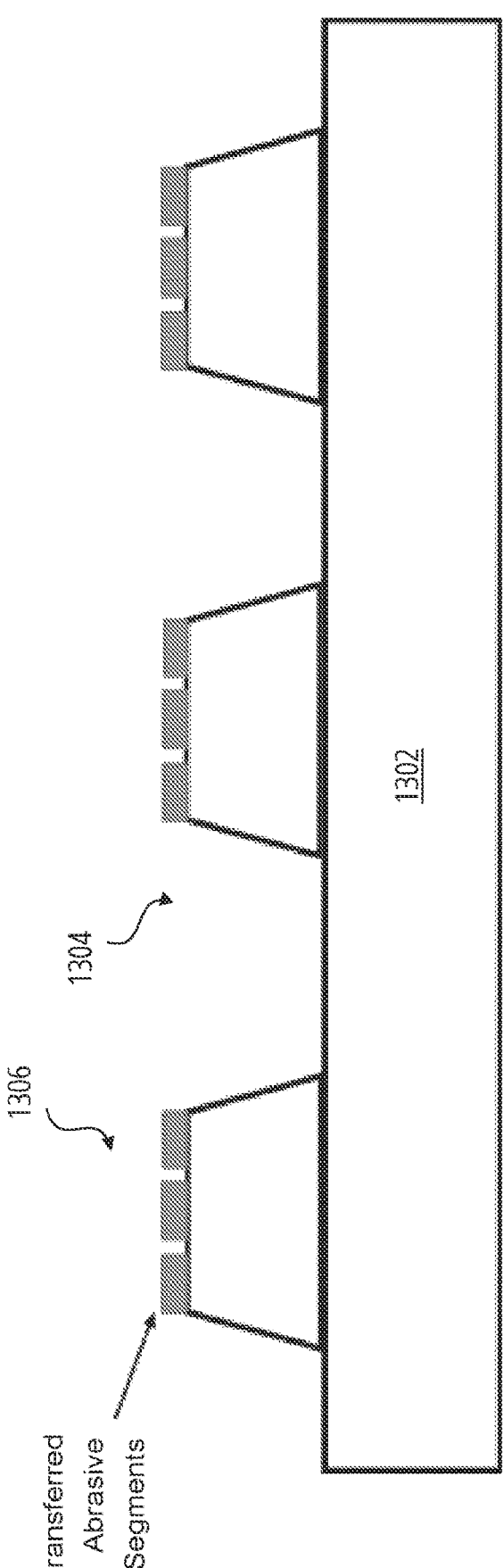
FIG. 13 illustrates a contoured surface having a plurality of abrasive segments in accordance with one embodiment.

FIG. 13 illustrates a contoured surface 1302 that is a microreplicated surface. The microreplicated surface can have a plurality of protrusions 1304 with each protrusion having a plurality of abrasive segments 1306.

Contoured surface 1302 can be advantageous because the channels can provide a means for the more efficient transport of water and/or swarf. Also, modifications to the dimensions of the three-dimensional backing can provide a convenient means for control the unit pressure of the abrasive.

Figure 14:
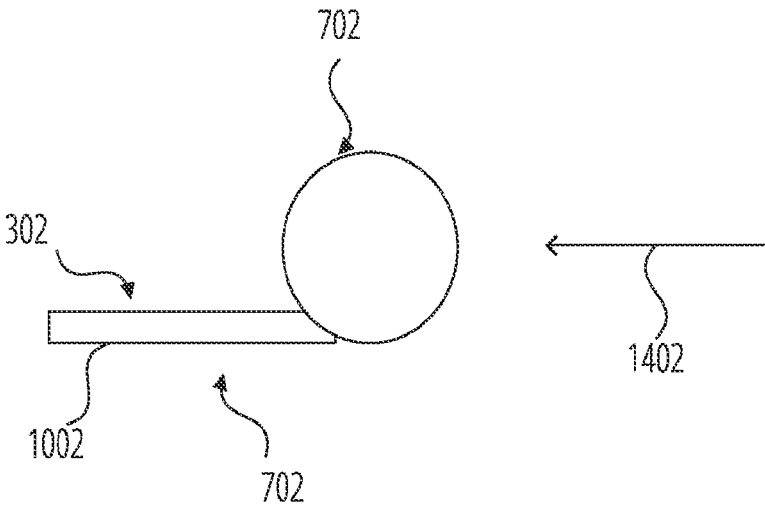
FIG. 14 illustrates a linerless abrasive assembly in a rolled configuration in accordance with one embodiment.

FIG. 14 illustrates the linerless abrasive assembly 1002 of FIG. 10 except in a rolled configuration 1404. To form the rolled configuration 1404, the outer surface of the conformable layer 702 can be coated with a releasable coating. The releasable coating can be any substance that allows an outer surface of the conformable layer to be coated with the releasable coating. The releasable coating can be any substance used to make a release liner as described in FIG. 3A and can be sprayed on or applied as a film.

In at least one embodiment, the releasable coating is configured such that the first adhesion between the second adhesive layer and the segment abrasive layer is at least 20 percent greater than a third adhesion between the segment adhesive layer and the releasable coating.

In at least one embodiment, the release liner can be removed from the plurality of abrasive segments to form a linerless abrasive assembly as illustrated in FIG. 10 and described in block 902.

Once removed, the linerless abrasive assembly 1002 can be rolled such that the segment adhesive layer 302 from the plurality of abrasive segments contacts the conformable layer 702 (shown on the outside surface of the rolled configuration 1404). In at least one embodiment, the rolled configuration 1404 can be rolled in a direction 1402 such that the rolled configuration 1404 becomes larger as it is rolled.

EXAMPLES

Preparation of Sample

An abrasive-backed adhesive sheet shown in FIG. 3A was prepared. The abrasive layer and abrasive backing layer were substantially prepared according to the method described in Example 1, U.S. Pat. Pub. No. 2017/0043450 to Graham et. al., except that: (1) the thickness of the polyurethane flexible film was two thousandths of an inch (mils) instead of five thousandths of an inch; (2) the ABR abrasive particles were P400-graded aluminum oxide commercially available from Art Abrasives Limited (Suzhou, China) instead of P320 semi-friable blend; (3) the size layer precursor was coated at a nominal dry coating weight of 26 grams per square meter instead of 42 grams per square meter; and (4) no supersize coating was applied to the abrasive layer.

Adhesive was applied to abrasive backing layer. The adhesive was the same adhesive used on the commercially available 9453LE transfer tape from 3M (St. Paul, MN). The release liner was the printed side of the release liner on the commercially available 9453LE transfer tape.

Adhesion Testing

The adhesion between the abrasive backing layer and the adhesive layer was substantially measured according to ASTM D1876 (2015). The instrument used was an Instron 5967 and the peel rate was set to 10 inches per minute. The adhesion between the abrasive backing layer and the adhesive layer was found to be 2.0 pounds per inch.

The adhesion between the adhesive layer and the release liner was substantially measured according to a 180-degree peel test substantially described in ASTM D5375(2019). The adhesion was measured on an imass SP-2000 slip/peel tester, and the peel rate was set to 90 inches per minute. The adhesion between the adhesive layer and the release liner was found to be 0.24 ounces per inch.

"Border segment" refers to an edge of an abrasive segment. The border segment includes at least part of the perimeter of the abrasive segment.

"Continuous" refers to without a gap or a break. Continuous can indicate that the layer essentially covers an entire surface, with the possible exception of common coating defects such as pinholes and the like.

"Contoured surface" refers to a surface that has curves and slopes on it, rather than being flat. The curves and slopes mentioned herein would be visible to an unaided human eye since no surface is perfectly flat at the microscopic level.

"Intact" refers to not impaired and also capable of being handled as a single component. In at least one embodiment, an intact release liner can also be continuous.

"Layer" refers to a thickness of material covering a surface.

"Line of weakness" refers to a line in a sheet of material, such as the release liner, along which the material has been weakened through removal of at least some of the material along that line. This facilitates the separation of a portion of the sheet from the remainder of it along a desired line. In at least one embodiment, the "line of weakness" is a line in a sheet of material, such as paper or cardboard, along which the material has been weakened through removal of substantially all the material along that line. For example, the "line of weakness" may be provided as a pre-cut line, such that a portion of the sheet is already substantially locally separated from the remainder of the sheet material.

"Slit" refers to a long narrow cut or opening. Slits may also result in lines-of-weakness.

What is claimed is:

1. A method of making an abrasive assembly, the method comprising:
   receiving a segmented adhesive-backed abrasive article comprising:
   a release liner; and
   a plurality of abrasive segments disposed on the release liner, wherein each abrasive segment comprises a segment abrasive layer and a segment adhesive layer that each have a smaller planar surface area than a planar surface area of an adhesive-backed abrasive sheet, wherein the release liner of the segmented adhesive-backed abrasive article is continuous and connects the plurality of abrasive segments, wherein the plurality of abrasive segments are discrete from each other;
   applying transfer film assembly to the segmented adhesive-backed abrasive article, wherein a second adhesive layer of the transfer film assembly adheres to the segment abrasive layer, wherein the segment abrasive layer is sandwiched between the segment adhesive layer of a first adhesive layer and the second adhesive layer, wherein a first adhesion between the second adhesive layer and the segment abrasive layer is at least 2 times a second adhesion between the segment adhesive layer and the release liner.

2. The method of claim 1, further comprising forming the segmented adhesive-backed abrasive article by:
   obtaining the adhesive-backed abrasive sheet comprising an abrasive layer, the first adhesive layer, and the release liner disposed on the first adhesive layer;
   forming the segmented adhesive-backed abrasive article by forming a plurality of abrasive segments within the adhesive-backed abrasive sheet.

3. The method of claim 2, wherein the abrasive layer is continuous prior to forming the plurality of abrasive segments.

4. The method of claim 2, wherein the adhesive-backed abrasive sheet comprises the abrasive layer having a first abrasive side and a second abrasive side, an abrasive backing layer having a first backing side and a second backing side, the first adhesive layer having a first adhesive side and a second adhesive side,
   wherein the abrasive backing layer is disposed on the second abrasive side, and the first adhesive layer is disposed on the second backing side.

5. The method of claim 4, wherein the release liner having a first release liner side and a second release liner side, wherein the first release liner side is disposed on the second adhesive side of the first adhesive layer.

6. The method of claim 5, wherein forming the plurality of abrasive segments comprises cutting the release liner such that the first release liner side is penetrated but the second release liner side is not penetrated.

7. The method of claim 6, wherein the abrasive segment of the plurality of abrasive segments contacts at least 2 other abrasive segments from the plurality of abrasive segments.

8. The method of claim 6, wherein cutting the adhesive-backed abrasive sheet occurs in one direction.

9. The method of claim 8, wherein an angle of the cut is non-orthogonal to a planar surface of the adhesive-backed abrasive sheet.

10. The method of claim 8, wherein cutting the adhesive-backed abrasive sheet occurs in at least two directions, a first direction intersects with a second direction.

11. The method of claim 10, wherein cutting the adhesive-backed abrasive sheet occurs in both a cross direction and a machine direction to form border segments within the abrasive segment of the plurality of abrasive segments.

12. The method of claim 1, wherein the release liner is intact and not divided into segments.

13. The method of claim 1, wherein the release liner is a microreplicated surface.

14. The method of claim 1, wherein forming the segmented adhesive-backed abrasive article comprises printing the plurality of abrasive segments on the release liner.

15. The method of claim 1, wherein the abrasive segment has an area no greater than 3 centimeters squared.

16. The method of claim 1, wherein the first adhesion is at least 2 pounds per inch.

17. The method of claim 1, wherein applying the transfer film assembly comprises using selective pressure on predetermined regions on the plurality of abrasive segments.

18. The method of claim 1, wherein the transfer film assembly comprises a conformable layer and the second adhesive layer, wherein an outer surface of the conformable layer is coated with a releasable coating, further comprising:

removing the release liner from the plurality of abrasive segments to form a linerless abrasive assembly;

rolling the linerless abrasive assembly such that the segment adhesive layer from the plurality of abrasive segments contacts the conformable layer.

19. A method of applying the abrasive assembly of claim 1 comprising:

applying the first adhesive layer of the plurality of abrasive segments to a contoured surface; and removing the transfer film assembly from the contoured surface, wherein at least some of the plurality of abrasive segments from the abrasive assembly are retained on the contoured surface.

20. The method of claim 19, wherein a third adhesion between the first adhesive layer and the contoured surface is greater than the first adhesion.

* * * * *